Jan. 23, 1962   L. E. FOGARTY   3,018,052
SERVO FUNCTION GENERATOR
Filed Dec. 13, 1956   3 Sheets-Sheet 1

LAURENCE E. FOGARTY
INVENTOR

BY Darby & Darby
ATTORNEYS

Jan. 23, 1962        L. E. FOGARTY        3,018,052
SERVO FUNCTION GENERATOR
Filed Dec. 13, 1956                                  3 Sheets—Sheet 2

LAURENCE E. FOGARTY
INVENTOR

BY *Darby & Darby*
ATTORNEYS

Jan. 23, 1962 L. E. FOGARTY 3,018,052
SERVO FUNCTION GENERATOR
Filed Dec. 13, 1956 3 Sheets-Sheet 3

LAURENCE E. FOGARTY
INVENTOR

BY *Darby + Darby*
ATTORNEYS

United States Patent Office

3,018,052
Patented Jan. 23, 1962

3,018,052
SERVO FUNCTION GENERATOR
Laurence E. Fogarty, Binghamton, N.Y., assignor to General Precision Inc., a corporation of Delaware
Filed Dec. 13, 1956, Ser. No. 628,136
4 Claims. (Cl. 235—197)

This invention relates to electrical analog computers, and more particularly, to an improved servo multiplier or servo function generator for use with analog computers. In the electrical arts generally, and particularly in the analog computer, automatic control and instrumentation arts, widespread use is made of servo multipliers and servo function generators. Such apparatus commonly comprises a means responsive to a computer input quantity which provides an output quantity commensurate with a specified mathematical or empirical function (often a highly non-linear function) of the input quantity. As a specific example, much electrical analog computation apparatus utilizes one or more electrically-operated servos which position the arms of variable potentiometers or the rotors of induction resolvers or variable transformers in accordance with the value of an independent variable in order to provide an output quantity, usually a voltage, commensurate in magnitude and polarity with the value of a specified non-linear function of said variable. It is known that both position and velocity servos operate at various times with position or velocity lags or other errors, thereby causing output quantities derived by such servos to be in error at various times. While such errors may be neglected in certain applications, in others they may not, and some analog computer, automatic control or instrumentation apparatus comprises a plurality of interdependent and intricately interconnected servos, so that errors resulting from dynamic limitations of a first servo may adversely affect the operation of further servos, sometimes causing considerable instability, hunting and computer inaccuracy. A need exists in the art for servo function generators and multipliers which have minimum error due to servo velocity lag.

It is therefore a primary object of the present invention to provide an improved servo multiplier or function generator for analog computer, automatic control and instrumentation applications.

It is another object of the invention to provide an improved servo multiplier or function generator which will compensate for the time lag of the servo utilized therein so as to provide more accurate analog computation.

Other objects of the invention will in part be obvious and will in part appear hereinafter.

The invention accordingly comprises the features of construction, combinations of elements, and arrangement of parts, which will be exemplified in the constructions hereinafter set forth, and the scope of the invention will be indicated in the claims.

For a fuller understanding of the nature and objects of the invention reference should be had to the following detailed description taken in connection with the accompanying drawings, in which.

Figure 1:
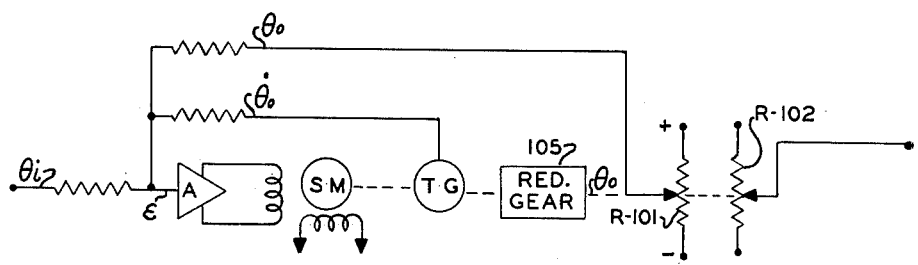
FIG. 1 is a block diagram of a type of conventional prior art servo function generator or multiplier.

Referring now to the prior art device shown in FIG. 1, an input potential $\theta_i$ is applied to a comparing means shown as comprising a parallel-adding summing amplifier A to be compared with a position feedback potential $\theta_o$ and a first derivative feedback potential $\dot{\theta}_o$ derived respectively from a position feedback or "follow-up" potentiometer R–101 and a tachometer generator TG. The output quantity from the amplifier, which output quantity is commensurate with the difference between the input signal $\theta_i$ and the feedback signals, and which is designated the servo error quantity $e$, is amplified and utilized to operate a motive means SM which drives position feedback potentiometer R–101 and tachometer generator TG. Feedback or re-balancing potentiometer R–101 may be excited by a constant potential from a conventional computer power supply. Servo motor SM drives potentiometer R–101 through a speed reduction gearing system shown in block form at 105 in FIG. 1.

A multiplying or function generating potentiometer R–102 has its wiper arm positioned by servo motor SM, and potentiometer R–102 is provided with a desired voltage versus shaft displacement characteristic so as to provide a potential on the arm of potentiometer R–102 commensurate with the instantaneous value of the desired function of servo output shaft position $\theta_o$. It will be seen that from a steady-state viewpoint, output shaft position $\theta_o$ will bear a constant relationship to input quantity $\theta_i$ so as to derive a specified function of the input quantity $\theta_i$, but it also will be recognized that unless the servo is balanced in a steady-state position, that the output potential on the arm of potentiometer R–102 will be in error, in an amount commensurate with servo lag. It is well known to those skilled in the art that servo velocity lag may be decreased somewhat by increasing servo loop gain, but that only a limited amount of loop gain may be provided in an ordinary servo without causing instability. Thus a certain amount of velocity lag is present in all position servos while they are moving, and the use of such servos to operate function generators or multipliers causes errors in the values of computed functions or products because of such velocity lag at all times except when such servos are at rest. As will be explained in detail below, the invention provides means whereby such errors may be considerably decreased.

In accordance with the invention, the operation of any feedback device which tends to seek a null or balanced condition may be considered to be operative over an interval of convergence of a power series, i.e., a Taylor series. Designating $x_o$ as the instantaneous output position of a servo connected to operate a functional potentiometer to derive a voltage as a function of the independent variable $x$, and considering that $x_o$ will equal $x$ or a function of $x$ when the servo is balanced, one may write a series expansion of $f(x)$ in the neighborhood of the instantaneous servo output position $$x_o f(x) = f(x_o) + \frac{f'(x_o)(x-x_o)}{1!} + \frac{f''(x_o)(x-x_o)^2}{2!} + \frac{f'''(x_o)(x-x_o)^3}{3!} + \cdots$$

Considering the above expression with relation to the conventional servo function generator of FIG. 1, it may now be deduced that each of the terms of the power series is either available or may be synthesized from quantities readily available from the servo. The initial term $f(x_o)$ will comprise the output potential on the arm of potentiometer R–102. This term is what the prior art commonly has utilized as the entire value of the desired output function, thereby making the assumption that $f(x)$ equals $f(x_o)$.

Inasmuch as the desired function of x is known and built into potentiometer R-102, the $f'$ of the second term of the power series may be deduced by differentiating $f(x)$ with respect to the independent variable $x$. What is quite less apparent, but nevertheless true, is that the $(x-x_0)$ portion of the second and succeeding terms of the series are successive ascending powers of the servo error signal. Since the servo error signal is available at all times as a voltage within the servo, it may be utilized in accordance with the invention to synthesize the higher order terms of the power series, so as to provide much more accurate values of the desired output function voltage. As will be explained more fully below, the number of terms of the power series to be synthesized and added to the basic prior art signal will depend upon the accuracy desired and the magnitudes of error signal developed by the servo during operation within the region of interest.

Figure 2:
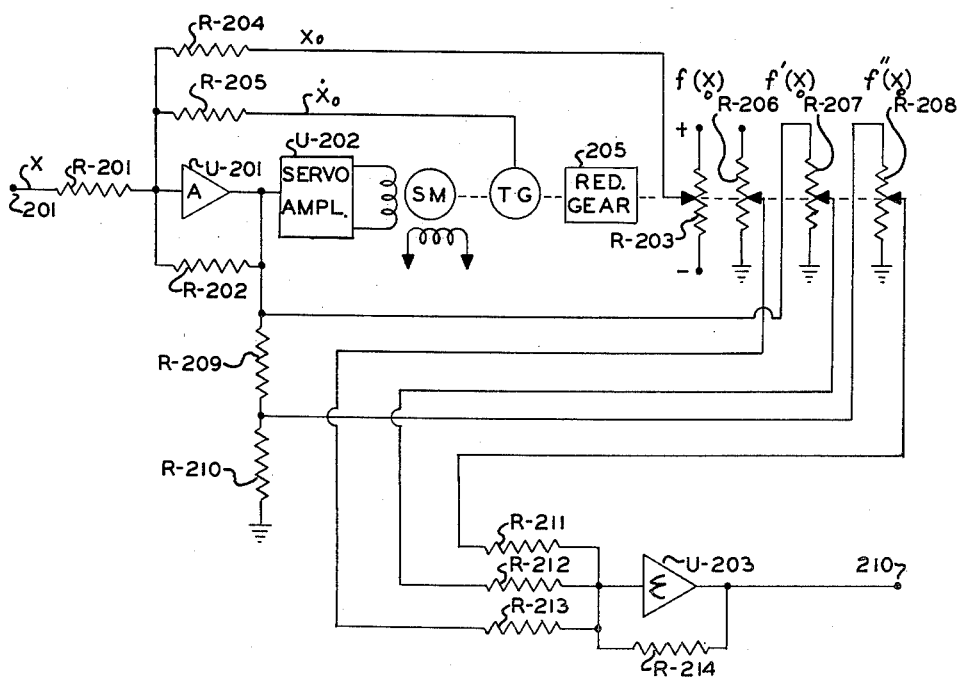
FIG. 2 is an electrical schematic diagram partially in block form of an exemplary embodiment of the invention illustrating one manner in which the invention may be applied to position servo function generators.

Referring now to FIG. 2, there is shown in electrical schematic form an illustrative embodiment of the invention as applied to what is probably its most usual use, the more accurate generation of a function derived by a position servo function generator. An input voltage commensurate with the instantaneous value of the independent variable is applied at terminal 201 via summing resistor R-201 to the input circuit of a comparing means shown as comprising a feedback amplifier U-201. Also applied to the input circuit of amplifier U-201 are a position feedback or rebalancing voltage from follow-up potentiometer R-203 and a rate feedback voltage from tachometer generator TG. The output voltage from amplifier U-201, which voltage is the servo error signal $\epsilon$, is amplified considerably by means of a conventional servo amplifier shown in block form as U-202. The output voltage from servo amplifier U-202 is applied to the control winding of a conventional two-phase alternating current servomotor SM, which motor is connected to drive tachometer generator TG. If D.-C. voltage signals are utilized, servo amplifier U-202 may comprise a magnetic amplifier having a control winding operated by the D.C. voltage output of amplifier U-201 and reactance windings excited from the same alternating voltage source as is used to excite the quadrature winding of the servomotor. Alternatively, if an alternating current amplifier system is to be used, a modulator such as a vibrator chopper may be used to modulate the amplified error signal. Various well known position servos may be utilized in practicing the invention.

In many embodiments of the invention amplifier U-201 merely will comprise an initial stage of a multi-stage servo amplifier. However, for best accuracy, it is essential to have available an output potential from the servo amplifier which is an accurate summation of the signals applied to the input circuit of the servo amplifier. If the servo amplifier stage from which the error quantity is taken is highly non-linear or tends to saturate during large error signal conditions, the benefits obtainable from the invention may be largely frustrated, since the computed values of the second and succeeding terms of the power series will be computed inaccurately. Amplifier U-201 is shown provided with a feedback impedance R-202 to signify that the error signal output should be taken from the output of a substantially linear circuit.

Potentiometer R-206 is excited by a constant voltage, and its arm is positioned by the servo shaft so as to provide an output potential for application to a summing circuit. As discussed above, this potential will correspond to the potential generated by prior art servo function generators. To provide a corrective term corresponding to the second term of the series, the error signal voltage from amplifier U-201 is applied to excite potentiometer R-207, the arm of which also is positioned by the servo output shaft. Potentiometer R-207 is provided with a voltage versus shaft position characteristic which is the first derivative of the desired function with respect to the input independent variable. For example, if the input quantity applied to terminal 201 represents an angle and the desired output function is the sine function of the angle, potentiometer R-206 will be provided with a sine function winding and potentiometer R-207 will be provided with a cosine function winding. Since the error signal $\epsilon$ applied to excite potentiometer R-207 is commensurate with $(x-x_0)$, i.e., the difference between the servo steady-state position and its instantaneous position, and since potentiometer R-207 is provided with a slope which is the first derivative of $f'(x)$ of the desired output function $f(x)$, it will be seen that the potential applied via resistor R-212 may be commensurate with the second term of the power series. It will be readily apparent to those skilled in the art that the factorial constants of the terms of the series may be provided for by resistor scaling. Thus a corrective term has been supplied for addition to the basic term, serving to improve the accuracy of the desired computed function during all transient conditions without adversely affecting the steady-state accuracy of the servo position or computed function.

Since very many servomechanisms are provided with sufficient loop gain and high enough frequency response to maintain usual servo velocity lag at low percentages of the servo range of operation, it is often sufficient to supply only the second term of the power series to provide acceptable accuracy. However, in cases where servo function generators having greater accuracy lag are used, or in cases in which maximum accuracy of function generation is desired, further terms of the series may be derived and combined with the two potentials computed as described above. FIG. 2 illustrates means by which a single further term may be derived, and in view of this disclosure those skilled in the art will have no trouble in synthesizing as many of the terms of the series as are desired. The servo error quantity is also applied to a squaring device shown as comprising non-linear and linear resistances R-209 and R-210 connected in series. Non-linear resistor R-209 is selected so as to have a resistance which decreases as greater voltages are applied across the resistor, thereby developing a voltage across linear resistor R-210 substantially commensurate with the square of the servo error voltage. The squared potential is applied to excite the winding of potentiometer R-208, the arm of which also is positioned by the servo. Potentiometer R-208 is provided with a voltage versus shaft position characteristic which is the second derivative of the basic desired function, i.e., the first derivative of the function of potentiometer R-207. The voltage on the arm of potentiometer R-208 will be seen to be commensurate with the third term of the power series, and if this further voltage is combined with the voltages from potentiometers R-206 and R-207 a further increase in accuracy will result. In FIG. 2 the three synthesized terms of the power series are shown as being applied to a feedback summing amplifier. In many uses of the invention these potentials may be combined in different ways, such as at the input circuit of an electronic integrator, or at the input circuit of a further servo, perhaps being combined with further potentials which are to be added to the generated value of the function. The squaring circuit shown is exemplary only, and numerous known circuits, some employing diodes, for example, may be substituted for the voltage squaring means shown herein.

Figure 3:
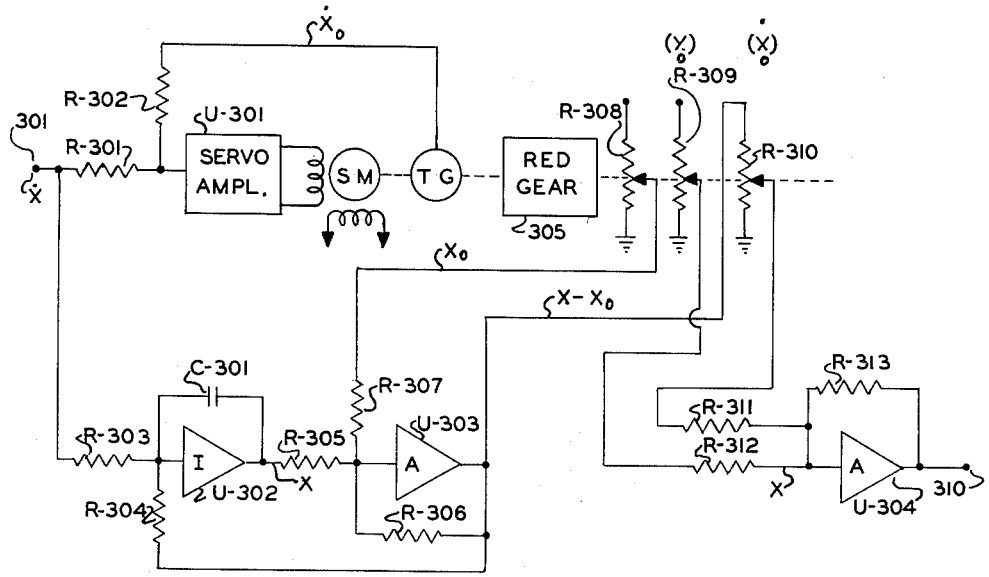
FIGS. 3 and 4 are electrical schematic diagrams each illustrating a different manner in which the invention may be employed in velocity servo function generators.
Figure 4:
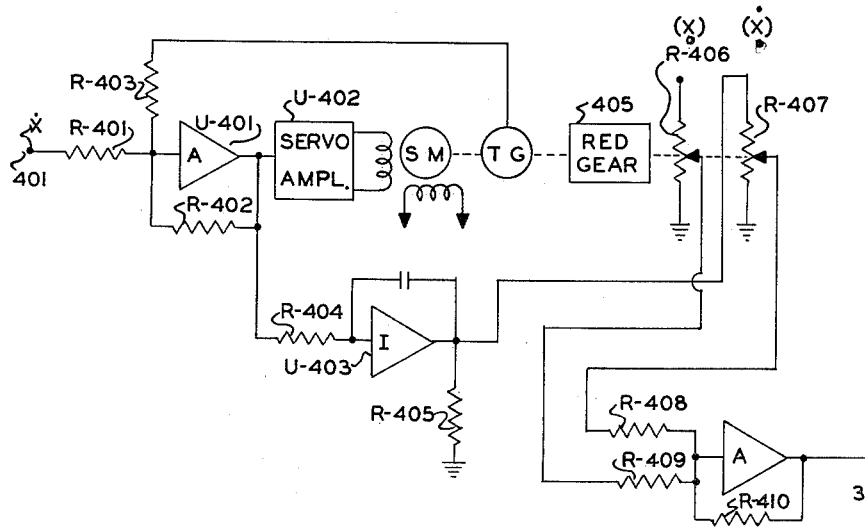

A wide variety of computer, automatic control and instrumentation devices incorporate velocity servo function generators or multipliers. Numerous problems solved by such devices utilize velocity servos responsive to input quantities commensurate with the time rate of change of an independent variable to position the arms of multiplying or function generating potentiometers, and the invention is applicable to this type of function generator as well as to position servo devices. FIGS. 3 and 4 illustrate two alternative and exemplary embodiments of the invention incorporated in velocity servo function generators. In FIG. 3, a potential commensurate with $\dot{x}$, the time rate of change of the independent variable, is applied via scaling resistor R-301 to the input circuit of a conventional servo amplifier U-301. Also applied to the input circuit to be compared with the input signal is a rate signal derived by means of tachometer generator TG and applied via scaling resistor R-312. The servo amplifier amplifies the difference between these signals and drives servomotor SM at a velocity approximately commensurate with the value of the input potential $\dot{x}$, so that the shaft position of the servomotor SM is substantially a measure of the time integral $x$ of the applied input quantity $\dot{x}$. Thus the velocity servo output shaft may be utilized to position the arms of potentiometers to derive voltages which are functions of the variable $x$. As described thus far, the velocity servo is completely conventional, and may comprise any one of a number of currently available velocity servos.

Inasmuch as all velocity servos have finite mechanical inertia, friction, and other mechanical limitations, the servo output shaft speed does not immediately and accurately follow variations in the applied input quantity, and as a result, values of a function computed by potentiometers positioned by the velocity servo shaft are in error. FIG. 3 illustrates one manner for determining the amount of error, and for utilizing the error quantity to synthesize the second term of the Taylor series to diminish the error in the instantaneous value of the function generated by the velocity servo.

The $\dot{x}$ input quantity is also applied via scaling resistor R-303 to the input circuit of a conventional electronic integrator I-302 shown as a feedback amplifier having a capacitor C-301 connected in its feedback circuit. As is well known to those skilled in the art, an electronic integrator does not suffer in practical respects from the inertia and friction limitations of a velocity servo integrator, and it provides an output potential which is immediately an accurate measure of the time integral $x$ of the applied input quantity $\dot{x}$. As shown in FIG. 3, the true time integral potential from electronic integrator U-302 is applied via resistor R-305 to the input circuit of summing amplifier U-303. Potentiometer R-308 is excited by a constant potential from a power supply (not shown), and the wiper arm of potentiometer R-308 is positioned by the output shaft of the velocity servo, thereby deriving a potential commensurate with the "approximate" time integral $x$ of the quantity $\dot{x}$. This "approximate" time integral potential derived by means of the velocity servo shaft is applied via scaling resistor R-307 to be compared with the true time integral potential from electronic integrator U-302, thereby deriving an error potential at the output circuit of amplifier U-303 commensurate with the instantaneous deviation of the velocity servo from its correct position. It will be recognized that this potential is similar in nature to the error signal of the position servo of FIG. 2. The error potential from amplifier U-303 is applied to excite potentiometer R-310 to provide the second term of the power series, potentiometer R-309 providing the initial term in conventional manner. The initial term potential and the corrective term potential are shown as being applied via scaling resistors R-311 and R-312 to a utilization device shown as comprising an ordinary feedback summing amplifier, thereby providing a corrected output potential at terminal 310. As in the case of the position servo apparatus of FIG. 2, the potentiometer R-310 utilized to compute the second term of the series has a voltage versus shaft position characteristic which is the first derivative of the desired output function.

Inasmuch as most electronic integrators are subject to drive over long time periods, in some embodiments of the invention it is useful to provide a drift correction means. In FIG. 3, the error output potential from amplifier U-303 is connected through resistor R-304 to the input circuit of the electronic integrator. When the velocity servo has reached a steady-state position, the output voltage from amplifier U-303 will be zero. If the electronic integrator begins to drift, it will begin to provide an error potential at the output circuit of amplifier U-303. The error potential is fed back negatively via resistor R-304, a high impedance, so that a weak signal is applied as an input potential to correct the output drift of the electronic integrator. If amplifier U-303 has an even number of stages, i.e., if it does not provide polarity inversion, the drift connection may be as shown in FIG. 3, it being assumed that the electronic integrator does provide polarity inversion. If amplifier U-303 also provides polarity inversion, one may connect resistor R-304 from the output of an even numbered stage of amplifier U-303, or alternatively, a further amplifier may be used to invert the output from amplifier U-303 for application to the input circuit of the electronic integrator.

An alternative application of the invention to a velocity servo function generator is shown in FIG. 4. A conventional velocity servo positions the arm of potentiometer R-406 to provide the basic or initial term of the power series. An electronic integrator U-403 is connected to integrate the velocity servo error signal with respect to time, thereby deriving an output potential commensurate with the cumulative velocity error, i.e., the position error, of the servo. This potential is applied to excite a first derivative shaped potentiometer R-407, thereby providing a corrective term for combination with the basic term provided by potentiometer R-406. Upon application of a step function input potential at terminal 401, the velocity servo will accelerate to a steady velocity such that the rate feedback potential from tachometer generator TG substantially cancels out the input signal. During such accelerating time, electronic integrator U-403 will receive the velocity servo error signal and integrate it with respect to time, thereby providing an output potential commensurate with cumulative lag or position error of the velocity servo. Upon removal of the input signal and deceleration of the velocity servo, opposite polarity error signals will be applied to the electronic integrator, decreasing the electronic integrator output potential level. When the velocity servo has come to rest at a new position, a low output voltage may exist at the output circuit of the electronic integrator due to the difference between the accelerating and decelerating operation of the velocity servo. To insure that such a voltage is not present when the velocity servo is at rest in a steady-state position, and also to correct electronic integrator drift, resistor R-405 is provided to drain off the integrator output voltage, so that any residual voltage at the output circuit of the integrator due to drift or to velocity servo limitations does not provide a false corrective term when the velocity servo is in a steady-state position. The velocity servo embodiments of FIGS. 3 and 4 may also utilize errorsquaring means and second derivative function potentiometers to provide the third term of the power series in those cases where still greater accuracy is desired.

It should be noted that the invention is not applicable to all position servos. Position servos having non-linear feedback potentiometers or having feedback potentiometers excited in accordance with the instantaneous values of a second independent variable do not have error signals which are commensurate with the difference between instantaneous servo output position and steady-state servo output position so as to provide a quantity suitable for synthesizing the power series. Also, the invention would be inapplicable to a velocity servo constructed so as to integrate non-linearly with respect to time. In many cases in which position servo follow-up potentiometer excitation is modified in accordance with a second independent variable, the servo may be altered conveniently to use a linear constant-excitation follow-up potentiometer and the servo input quantity may be multiplied by the inverse of the second independent variable to provide equivalent operation. Then the invention may be utilized.

Figure 5:
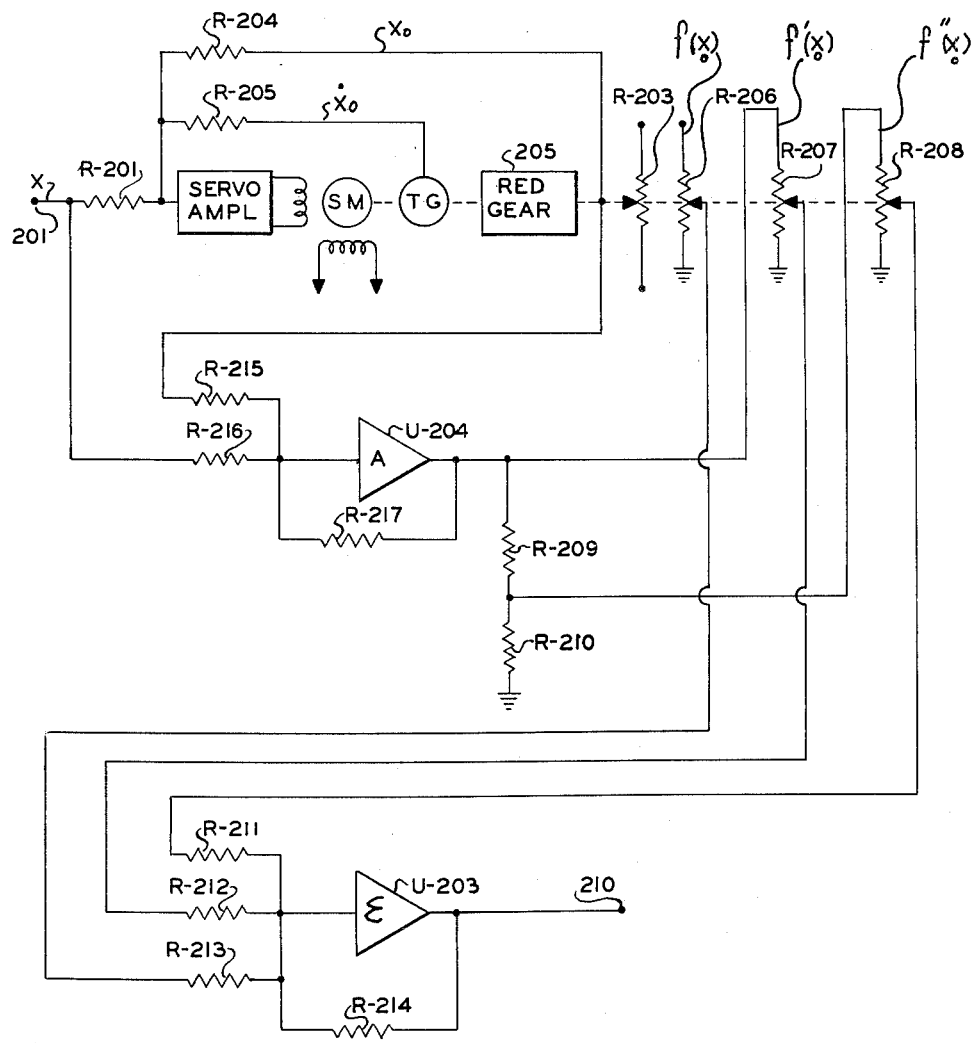
FIG. 5 is a schematic diagram of an alternative position servo embodiment of the invention.

As well as to the simple position and velocity servos shown, the invention may be applied to function generators or multipliers having servos which incorporate a large number of known refinements. In applying the invention to certain servos, such as those, for example, wherein lag and/or lead networks are inserted to operate upon the servo error signal, care should be taken that the quantity utilized to synthesize the power series term or terms has not been operated upon by the network so as to modify it substantially. In some applications it may be desirable to provide a separate error-computing comparing means which provides the error quantity for the power series computations, and not to use the exact error signal which is amplified to operate the servo motive means. For example, in FIGS. 1 and 2, the analysis above has considered the position servo error signal $e$ to equal $(x-x_o)$, which neglects the $\dot{x}_o$ tachometer feedback quantity applied from the tachometer generator TG. With tachometer or other rate feedback the actual quantity computed by the position servo apparatus of FIG. 2 is:

$$f(x_o) + \frac{f'(x_o)(x-x_o-K\dot{x}_o)}{1!} + \frac{f''(x_o)(x-x_o-K\dot{x}_o)^2}{2!}$$

thereby providing errors in the compensating second and third terms amounting to $$f'(x_o)\dot{x}_o \text{ and } f''(x_o)\dot{x}_o^2$$

respectively. In a number of applications the desired output function is such that $f'(x_o)$ and $f''(x_o)$ are sufficiently small, or servo velocity $\dot{x}_o$ and acceleration $\ddot{x}_o$ are sufficiently small that the above errors may be neglected. In other applications where greater precision is required, it may be desirable to provide a more exact $(x-x_o)$ quantity, such as by comparing the $x$ and $x_o$ quantities without the rate feedback quantity, in a separate comparing means. FIG. 5 shows portions of an arrangement similar to that of FIG. 2 in which such a further comparing means has been provided. The input quantity from terminal 201 and the servo instantaneous position quantity from followup potentiometer R–203 are applied via scaling resistors R–216 and R–215, respectively, to the further comparing means U–204, which is shown as comprising a conventional parallel-adding summing amplifier. The output quantity from amplifier U–204 represents the "true" error quantity, i.e., the rate feedback quantity is not included, and this error quantity is applied proportionately and squared to excite first and second derivative potentiometers R–207 and R–208.

The required output function and the derivatives of that function may be incorporated into the function potentiometers by a wide variety of well-known techniques, examples being the use of multi-tap potentiometer windings using constant excitation and/or padding resistors and diodes, and the use of potentiometers of varying resistance card width. The invention may be used for the generation of either mathematical or empirical functions. A number of analog computer, automatic control and instrumentation problems incident to the simulation of flight of aircraft and missiles may be solved much more accurately with use of the invention. The invention may be incorporated into multi-variable interpolating function generators, such as the type shown in application Serial No. 452,681, filed August 27, 1954, by John M. Hunt for "Function Generator" and assigned to the same assignee as the present invention. For clarity and simplicity of explanation, a number of buffer and polarity-inversion amplifiers which it may be desirable to use in certain embodiments of the invention have been omitted. While I have shown means for generating a single function with each of the servos shown, it will have become obvious at this point that further groups of potentiometers may be stacked to be operated by each servo shaft, and that the same servo error signal may be utilized to excite derivative potentiometers provided for the additional desired functions. In view of the above explanation those skilled in the art will readily recognize that the invention is applicable as well to mechanical, pneumatic and hydraulic servos and function generators, merely by making substitutions of equivalent elements well known in the art.

It will thus be seen that the objects set forth above, among those made apparent from the preceding description, are efficiently attained, and since certain changes may be made in the above constructions without departing from the scope of the invention, it is intended that all matter contained in the above description or shown in the accompanying drawing shall be interpreted as illustrative and not in a limiting sense.

Having described my invention, what I claim as new and desire to secure by Letters Patent is:

1. Analog computer function generating apparatus for deriving an output potential commensurate with a desired function of an independent variable, comprising, in combination: an electrical velocity servo-mechanism responsive to an input potential commensurate with the time rate of change of said independent variable and operative to move an output shaft at a rate substantially commensurate with said input potential toward a mechanical output position commensurate except for an instantaneous position error with said independent variable; a plurality of potentiometers positioned by said servomechanism, each of said potentiometers being operable to provide a voltage commensurate with an individual term of a power series expressing the value of said desired function, a first of said potentiometers being provided with a voltage versus mechanical position characteristic commensurate with said desired function of said independent variable, a second of said potentiometers being provided with a voltage versus mechanical position characteristic commensurate with the first derivative of said desired function with respect to said independent variable; means for deriving a position error potential commensurate with said instantaneous position error, said second potentiometer being connected to modify said position error potential; and means for combining the voltages from said potentiometers to provide said output potential; said servo-mechanism providing a steady-state mechanical output position commensurate except for said instantaneous position error with the time integral of said input potential, said means for deriving said position error potential comprising means for deriving a first potential commensurate with instantaneous servo output position, an electronic integrator responsive to said input potential for integrating said input potential with respect to time to provide a second potential, and potential comparing means responsive to said first and second potentials for providing a position error potential commensurate with the difference between said first and second potentials.

2. Analog computer function generating apparatus comprising in combination, an electrical velocity servo mechanism responsive to an input potential commensurate with the time rate of change of a variable and operative to provide a mechanical output position commensurate except for an instantaneous position error with the value of said variable, a first potentiometer positioned by said servomechanism to provide a first potential commensurate with said output position, an electronic integrator responsive to said input potential and operative to provide a second potential, potential difference-determining means responsive to said input potential and said second potential and operable to provide a position error potential, a second potentiometer positioned by said servomechanism and excited in accordance with said position error potential to provide a third potential, a third potentiometer positioned by said servomechanism and operative to provide a fourth potential, and means for combining said third potential and said fourth potential to provide an output potential, said third potentiometer having a voltage versus mechanical position characteristic in accordance with a desired function of said variable, and said second potentiometer having a voltage versus mechanical position characteristic in accordance with a derivative of said desired function with respect to said variable.

3. Apparatus according to claim 2 including circuit means for applying a portion of said position error potential to the input circuit of said electronic integrator, thereby to slowly force said position error potential to become zero during steady-state zero input potential conditions.

4. Analog computer function generating apparatus for providing, with improved dynamic response, an output quantity which varies in accordance with a desired function of a variable, comprising in combination; an integrating servomechanism responsive to a computer input quantity commensurate with the time rate of change of said variable and operative to position a mechanical output shaft at a position which is commensurate except for an instantaneous position error with said variable; means operated by said output shaft for deriving a feedback quantity commensurate with said position; a fast-response second integrator operable to integrate said computer input quantity with respect to time to provide a third quantity; difference-determining means operable to subtract said feedback quantity from said third quantity to provide a fourth quantity commensurate with said position error; a plurality of function generators operated by said servomechanism to provide a plurality of intermediate quantities, each of said intermediate quantities being commensurate with the value of a different term of a power series which expresses the value of said desired output function, one of said function generators being operable to provide a first intermediate quantity commensurate with said desired function evaluated at a value of said variable commensurate with the instantaneous position of said servomechanism, the second of said function generators being operable to modify said fourth quantity in accordance with the first derivative of said desired function of said variable evaluated at said value of said variable commensurate with the instantaneous position of said servomechanism to provide the second intermediate quantity; and means for combining said intermediate quantities to provide said output quantity.

References Cited in the file of this patent

UNITED STATES PATENTS

| | | |
|---|---|---|
| 2,404,011 | White | July 16, 1946 |
| 2,425,317 | Harris | Aug. 12, 1947 |
| 2,471,315 | Dehmel | May 24, 1949 |
| 2,567,532 | Stephenson | Sept. 11, 1951 |
| 2,686,636 | Lakatos et al. | Aug. 17, 1954 |
| 2,781,967 | Spencer et al. | Feb. 19, 1957 |
| 2,894,685 | Spencer et al. | July 14, 1959 |

FOREIGN PATENTS

| | | |
|---|---|---|
| 765,788 | Great Britain | Jan. 16, 1957 |
| 883,989 | France | Apr. 12, 1943 |